Aug. 15, 1939.  J. C. AYALA  2,169,785
HEAD FOR MACHINISTS' SCALES
Filed Sept. 13, 1938  2 Sheets-Sheet 1
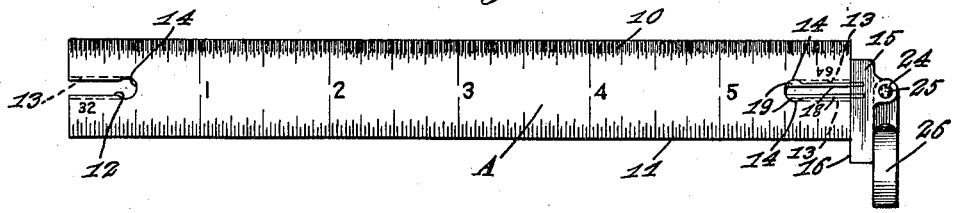
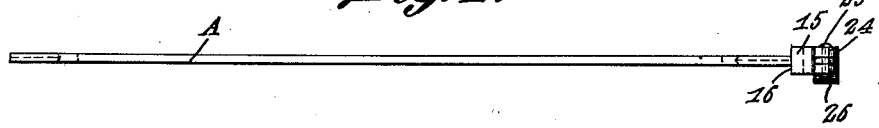
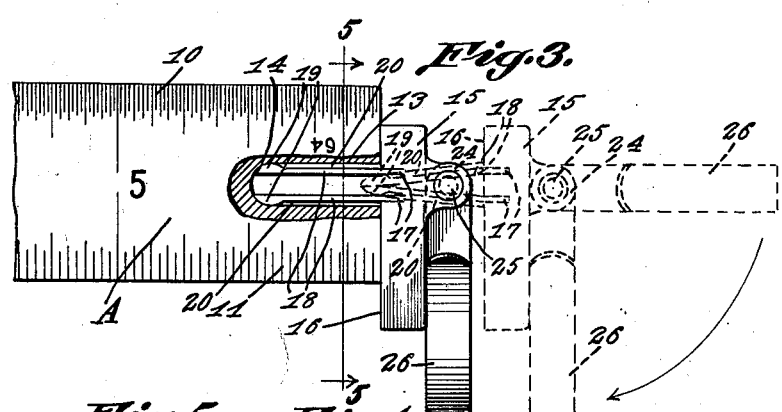
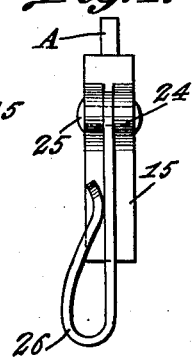 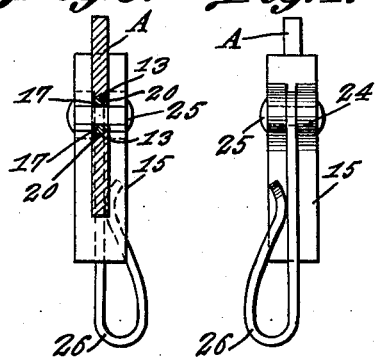 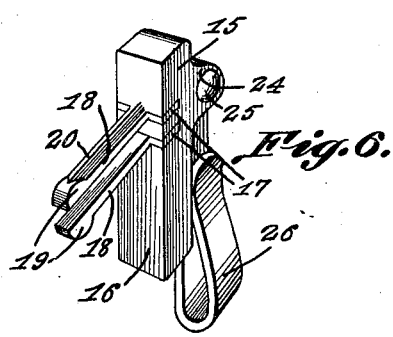
Juan C. Ayala, INVENTOR
BY Victor J. Evans & Co.
ATTORNEYS Aug. 15, 1939  J. C. AYALA  2,169,785
HEAD FOR MACHINISTS' SCALES
Filed Sept. 13, 1938  2 Sheets-Sheet 2

Juan C. Ayala, INVENTOR
BY Victor J. Evans & Co.
ATTORNEYS

Patented Aug. 15, 1939

2,169,785

UNITED STATES PATENT OFFICE 2,169,785

HEAD FOR MACHINISTS' SCALES

Juan C. Ayala, Monterrey, Mexico

Application September 13, 1938, Serial No. 229,766

1 Claim. (Cl. 33—173)

The invention relates to a scale and more especially to a head for a machinist's scale.

The primary object of the invention is the provision of a device of this character, wherein the scale bar has associated therewith, when the occasion requires, a head so that calipers, dividers or the like can be accurately adjusted according to the calibrations of the scale bar in that the instrument may abut the head to hold the arms of the dividers, calipers or the like in relation to the degree marks on the scale bar for accurate adjustment of such instrument.

Another object of the invention is the provision of a device of this character, wherein the same is susceptible of arrangement with relation to either end of the scale bar or blade so as to effect the proper abutment when adjusting a measuring instrument such as a divider, inside or outside calipers or the like.

A further object of the invention is the provision of a device of this character, which is simple in its construction, thoroughly reliable and efficient in operation, convenient for use with a scale, and inexpensive to manufacture.

With these and other objects in view, the invention consists in the features of construction, combination and arrangement of parts as will be hereinafter more fully described, illustrated in the accompanying drawings, which disclose the preferred and modified forms of embodiment of the invention and pointed out in the claim hereunto appended.

In the accompanying drawings:

Figure 1 is an elevation of a scale bar or blade showing the head constructed in accordance with the invention applied thereto.

Figure 2 is an edge elevation.

Figure 3 is an enlarged fragmentary side elevation partly broken away of the scale bar or blade showing by full lines the fixed position of the head and by dotted lnes the position of said head for the fixing thereof to the scale bar or blade.

Figure 4 is an end elevation of the head attached to the scale bar or blade.

Figure 5 is a sectional view on the line 5—5 of Figure 3 looking in the direction of the arrows.

Figure 6 is a perspective view of the head detached.

Figure 9a is a fragmentary side elevation.

Similar reference characters indicate corresponding parts throughout the several views in the drawings.

Figure 7:
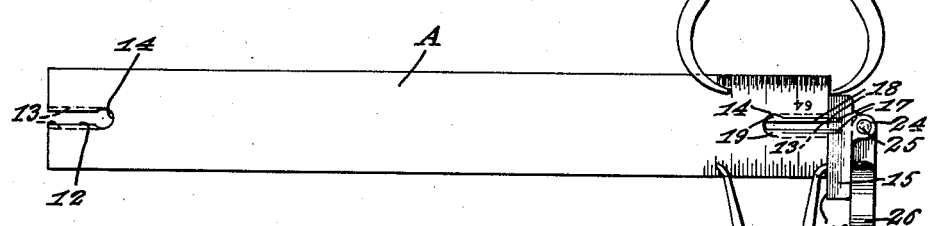
Figure 7 is a view similar to Figure 1 showing both inside and outside calipers arranged for accurate adjustment thereof with relation to the head and the scale bar or blade.
Figure 8:
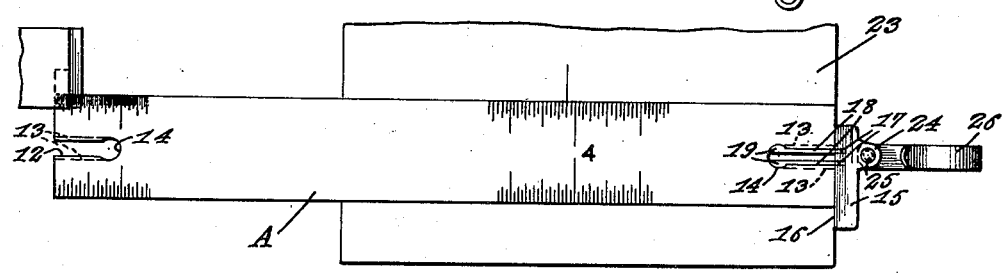
Figure 8 is a view similar to Figure 1 showing a piece of work arranged with relation to the head and scale bar or blade.

Referring to the drawings in detail, particularly Figures 1 to 8 inclusive, A designates generally a measuring rule, blade or bar, preferably of uniform thickness throughout the extent thereof, and having indicated on one flat face thereof graduated scale markings 10 and 11, respectively. This scale bar or blade has formed in opposite ends thereof key hole shaped slots 12, these opening through the outer ends thereof and opposite side walls of each slot have provided therein grooves 13 which are carried through the ends of the bar or blade and also into the larger inner circular portion 14 of the said slots 12 for a purpose presently described.

Usable with the bar or blade A is a head comprising a block-like body 15 of a width considerably greater than the thickness of the said bar or blade A and its contact face 16 is adapted to abut either end of the said bar or blade A when the head is attached thereto. The body 15 has anchored therein, as at 17, a pair of springy latching arms or jaws 18, these being spaced apart and disposed in parallel relation to each other while the free ends of the arms or jaws are half rounded to provide keeper terminals 19 while said arms or jaws at the outer sides thereof are provided with ribs 20 corresponding in shape to the grooves 13, the terminals being shaped in conformity to the circular end 14 of each slot 12. The arms or jaws 18 are slidably telescoped within the slots and by the inherent resiliency or springy condition of these arms lock within said slot to hold the body 15 in abutting relation to an end of the bar or blade A adjacent thereto. In this manner the head is fastened in place so that it will protrude beyond one longer edge of the bar or blade and also laterally beyond opposite flat faces thereof whereby inside or outside calipers 21 and 22, respectively, can be brought into a position for accurate adjustment thereof with relation to the graduating marks 10 and 11 on the scale bar or blade, the positioning of the calipers being shown in Figure 7 of the drawings with relation to the head and bar or blade for adjustment of such calipers. This head also when attached to the blade or bar A enables a piece of work 23 to be brought into abutment with such head for accurate measurement of the work to be operated upon.

The body 15 of the head is formed with a pivot bearing 24 in which is pivoted, as at 25, a swinging hook 26 allowing the hanging of the scale bar or blade with the head attached thereto upon a belt or the person in that the hook 26 can be engaged with the belt or with the pocket of a garment.

Figure 9:
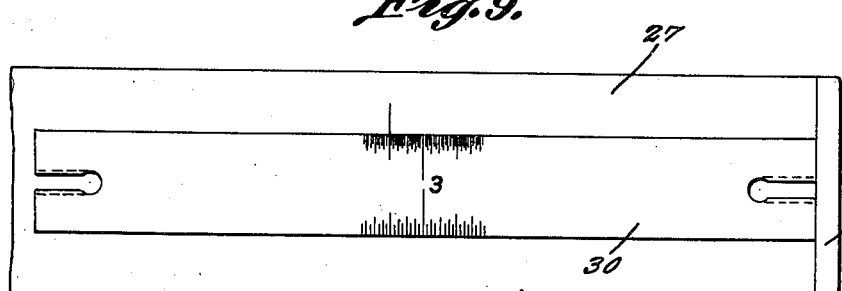
Figure 9 is a plan view of a modified form of the device.

In Figures 9 and 9a of the drawings there is shown a slight modification wherein a flat body 27 has formed at one end thereof an upstanding abutment 28 equaling the width of the said body 27 and rising above one flat face 29 thereof so that the scale bar or blade 30 can have either end contact with the rib 28 thus accurately setting the rule for measurement purposes with respect to a piece of work or with an instrument.

Figure 10:
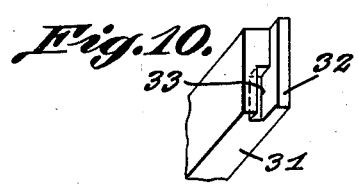
Figure 10 is a fragmentary perspective view of a modified form of abutment member for use with the main scale bar or blade.

In Figure 10 of the drawings there is shown a modification wherein a member 31 is provided and on one end thereof is formed a guide flange 32 while inwardly of this flange is a notch 33 opening through the end and one longer edge. Into this notch 33 is received a corner of the blade or bar A so that the instrument can be placed against this member 31 with relation to the graduations on the blade or bar for the setting of the instrument according to required measurements as is disclosed in Figure 7 of the drawings with respect to the preferred construction of the head therein shown.

What is claimed is:

The combination with a scale blade having measuring indicia thereon and also provided with a slot-like substantially keyhole shaped socket opening through one end thereof, of a head comprising a body of a thickness greater than the thickness of the said scale blade, and inherently resilient jaws carried by said body in spaced parallel relation to each other and having external formations corresponding to the socket for separably engaging the same on insertion of the said jaws in the socket.

JUAN C. AYALA.